United States Patent
Franz et al.

(10) Patent No.: US 11,891,929 B2
(45) Date of Patent: Feb. 6, 2024

(54) SUMP DEVICE HAVING A PIPE UNIT

(71) Applicant: ElringKlinger AG, Dettingen (DE)

(72) Inventors: Ralf Franz, Bad Urach (DE); Marco Saile, Pfullingen (DE)

(73) Assignee: ElringKlinger AG, Dettingen (DE)

( * ) Notice: Subject to any disclaimer, the term of this patent is extended or adjusted under 35 U.S.C. 154(b) by 177 days.

(21) Appl. No.: 17/088,004

(22) Filed: Nov. 3, 2020

(65) Prior Publication Data
US 2021/0047950 A1 Feb. 18, 2021
US 2021/0372303 A9 Dec. 2, 2021

Related U.S. Application Data

(63) Continuation of application No. PCT/EP2019/061268, filed on May 2, 2019.

(30) Foreign Application Priority Data

May 4, 2018 (DE) .......................... 102018110790.0

(51) Int. Cl.
*F01M 11/00* (2006.01)
(52) U.S. Cl.
CPC ... *F01M 11/0004* (2013.01); *F01M 2011/007* (2013.01)
(58) Field of Classification Search
CPC ...................... F01M 11/0004; F01M 2011/007
See application file for complete search history.

(56) References Cited

U.S. PATENT DOCUMENTS

| | | | | |
|---|---|---|---|---|
| 4,449,493 A * | 5/1984 | Kopec | ................. | F01M 11/064 |
| | | | | 123/196 R |
| 6,041,752 A * | 3/2000 | Van Klompenburg | ...................... | |
| | | | | F01M 11/0004 |
| | | | | 123/196 R |
| 6,142,257 A * | 11/2000 | Bruener | ............. | F01M 11/0004 |
| | | | | 123/196 R |
| 7,398,858 B2 * | 7/2008 | Bicker | ............... | F01M 11/0004 |
| | | | | 123/196 R |
| 10,359,015 B2 | 7/2019 | Pinault | | |
| 2002/0096221 A1* | 7/2002 | Kapcoe | ............... | F16H 57/0404 |
| | | | | 137/590 |
| 2010/0065014 A1* | 3/2010 | Dos Santos | ........ | F01M 11/0004 |
| | | | | 123/196 R |
| 2010/0300395 A1 | 12/2010 | Enokida | | |
| 2014/0166401 A1* | 6/2014 | Kubota | ............... | F16H 57/0443 |
| | | | | 184/6.2 |
| 2015/0028038 A1 | 1/2015 | Franz | | |

FOREIGN PATENT DOCUMENTS

| | | | | |
|---|---|---|---|---|
| DE | 202005003383 U1 * | 6/2005 | ............... | F01M 1/02 |
| DE | 102004024517 A1 | 12/2005 | | |
| DE | 102004056291 A1 * | 5/2006 | ........... | F01M 11/064 |

(Continued)

*Primary Examiner* — Minh Truong
(74) *Attorney, Agent, or Firm* — Reinhart Boerner Van Deuren P.C.

(57) ABSTRACT

In order to improve and in particular to more economically manufacture and/or assemble and/or maintain a sump device comprising a sump body particularly for an oil supply in a commercial motor vehicle having a pipe unit comprising a pipe body wherein the sump body is an injection moulded part of plastics material, it is proposed that the pipe unit be arranged on the sump body with play.

23 Claims, 8 Drawing Sheets

(56) References Cited

FOREIGN PATENT DOCUMENTS

| | | | |
|---|---|---|---|
| DE | 102010024228 A1 * | 12/2011 | ......... F01M 11/0004 |
| DE | 102014104688 A1 | 10/2015 | |
| DE | 102014019425 A1 | 6/2016 | |
| JP | S6365112 A | 3/1988 | |
| JP | 2017061894 A | 3/2017 | |
| WO | WO 2013/117533 A1 | 8/2013 | |

* cited by examiner

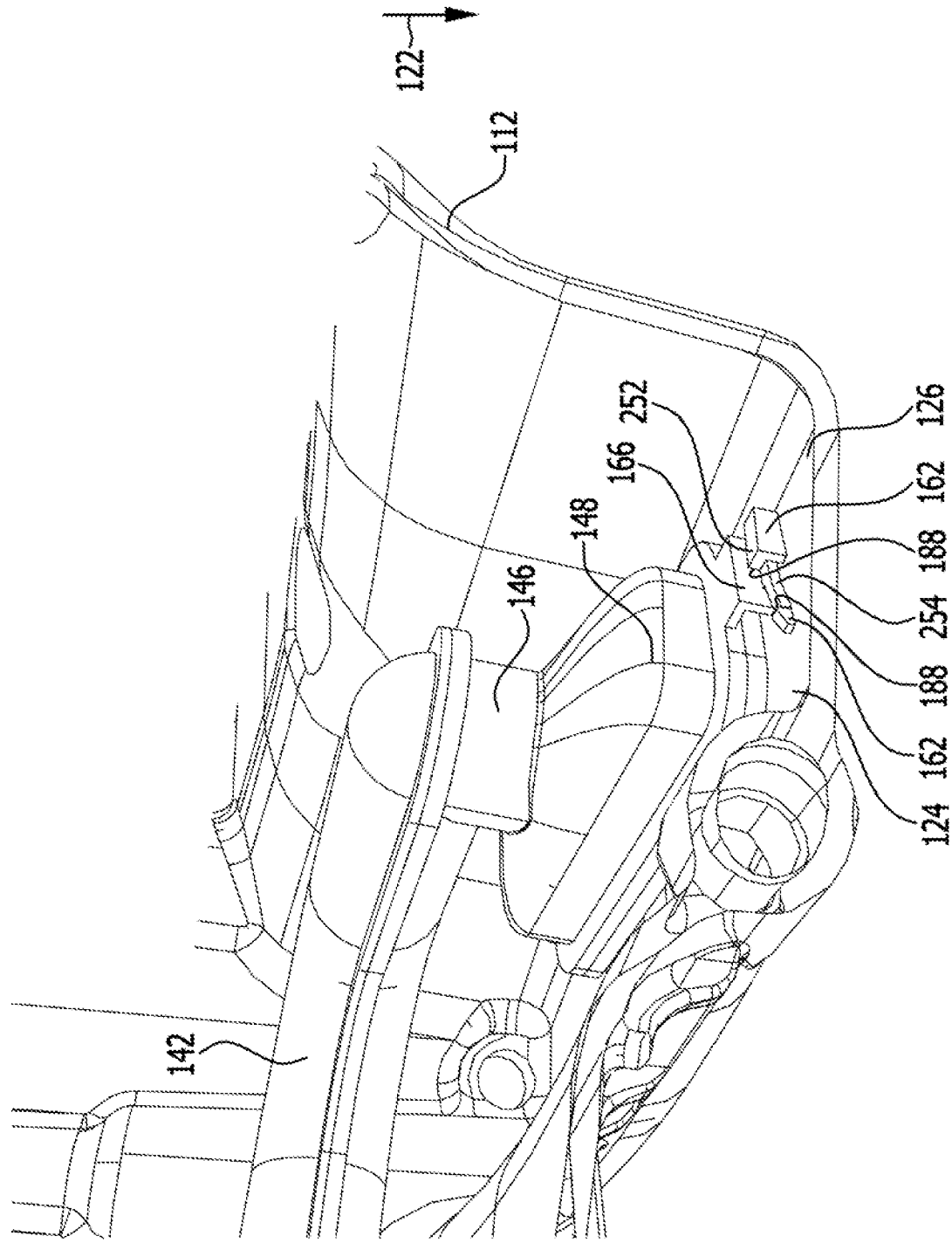

SUMP DEVICE HAVING A PIPE UNIT

CROSS-REFERENCE TO RELATED PATENT APPLICATION

This application is a continuation of International application number PCT/EP2019/061268 filed on May 2, 2019. This patent application claims the benefit of International application No. PCT/EP2019/061268 of May 2, 2019 and German application No. 10 2018 110 790.0 of May 4, 2018, the teachings and disclosure of which are hereby incorporated in their entirety by reference thereto.

BACKGROUND OF THE INVENTION

The invention relates to a sump device comprising a sump body having a pipe unit which comprises a pipe body wherein the sump body is an injection moulded part of plastics material.

In particular, the sump device is provided for the purposes of storing oil for an oil supply. In particular, the sump device is in the form of an engine oil sump for a combustion engine, in particular of a commercial motor vehicle.

In particular hereby, the pipe unit together with the pipe body when in an installed state is part of an oil line which leads for example to a combustion engine and/or an oil pump. Typically, the pipe unit is provided for extracting the oil and for the purposes of supplying oil for the oil line, whereby in particular the pipe body forms a suction pipe.

For example, particularly in the case of normal usage, the pipe unit comprises a suction part with a filter at an end of the pipe body which dips into the oil reservoir and is provided for extracting the oil. When the oil flows through the filter, in particular when the oil is being sucked out, the filter traps coarse dirt and thus expediently prevents the contaminants from entering the oil line.

SUMMARY OF THE INVENTION

The object of the invention is to improve sump devices, in particular, by producing them more economically and/or by simplifying the assembly and/or maintenance thereof.

In accordance with one aspect of the invention, this object is achieved by a sump device of the type specified hereinabove in that the pipe unit is arranged on the sump body with play.

Thereby, one of the advantages of the invention is to be seen in that the pipe unit is arranged with play and thus one of the ends of the pipe unit which is intended to be connected to a fluid line and in particular to an oil line can, during the assembly process, be positioned such as to match the positioning of a connector of the fluid line due to the play.

Expediently, the pipe unit and the connector of the fluid line can thereby be mounted on each other mare easily and more reliably in regard to the seal there between due to the precise positioning thereof.

In particular, the seal provided at an end of the pipe unit is improved since the latter can be freely centralised in the sealing seat due to the play.

Moreover, inaccuracies in the pipe unit and/or the oil line connector resulting from the manufacturing process can easily be compensated for due to the play and consequently component tolerances can be made greater, whence the production thereof can be effected more economically.

This is of significance in particular in regard to the injection moulded sump body since the component tolerances to be considered in the case of an injection moulding process are large.

In particular, due to the arrangement of the pipe unit with play, over determination in regard to the relative location of the pipe unit with respect to the connector of the fluid line is avoided, particularly when taking into consideration the position of a mounting flange of the sump device which likewise has to be precisely positioned during the assembly process.

Thus, the advantages which an injection moulded sump body of plastics material has, such as the economical production thereof, can be exploited and simple assembly of the sump device is made possible at the same time.

Additionally and in an expedient manner, the pipe unit is adapted to the sump body in captive manner due to the arrangement on the sump body.

In particular, a nominal position for the pipe unit is provided and the pipe, unit is arranged in this nominal position with play and in particular, the pipe unit is held in this nominal position with play.

Typically, the sump body has a depth direction. In particular hereby, the sump body comprises a sump chamber which, commencing from a sump opening, extends into the sump body in the direction of the depth direction. In particular hereby, the sump chamber forms a space for the reservoir for the oil.

In particular, the depth direction is at least approximately parallel to a withdrawal direction.

The withdrawal direction is that direction in which the injection moulded sump body is removed from the corresponding mould during the production process.

In the field of injection moulding technology, the withdrawal direction is also frequently referred to as the demoulding direction or else as the to-and-fro direction of the injection moulding tool.

In normal usage of the sump device, the depth direction preferably runs at least approximately parallel to the direction of the force of gravity.

Hereby, both in regard to the preceding and the following description, the formulation "at least approximately" is to be understood as meaning that technically irrelevant deviations from the specified value are also included. For example, deviations from the specified value of up to +20%, preferably of ±10%, and expediently up to ±5% of the specified value are included. In the case of an at least approximately parallel orientation of two directions, then in particular, directions that include an angle of up to 20°, preferably of up to 10° and in particular of up to 5° with respect to one another are likewise to be understood as being at least approximately parallel.

For example, provision is made for the pipe unit to be arranged and in particular held with play at least partially in the direction of the depth direction.

This makes it possible to have a particularly expedient assembly process since the pipe unit and in particular an opening of the pipe body can be precisely oriented in the direction of the depth direction for the connector of the oil line.

In the case of some embodiments, provision is made for substantially the entire pipe unit to be arranged with play at least approximately in the direction of the depth direction.

In the case of particularly advantageous embodiments, provision is made for the end of the pipe unit which is provided for connection to the fluid line to be arranged with pray at east approximately in the direction of the depth direction.

In the case of some embodiments, provision is made for the other end of the pipe unit which dips in particular into the oil reservoir in order to suck out the stored oil for example to likewise be arranged with play at least approximately in the direction of the depth direction.

In the case of other particularly advantageous embodiments, provision is made for this other end to be arranged substantially without play at least approximately in the direction of the depth direction. This, for example, offers the advantage that the pipe unit is arranged at least partly rigidly on the sump device and signs of wear due to too much shaking of the pipe unit within its permitted degree of play for example are decreased.

Hereby moreover, this end of the pipe body can be rigidly fixed close to the base in advantageous manner so that on the one hand the end still dips into the oil even in a state where the oil level is very low whereas on the other hand, the end remains spaced from the base so that a fluid-conveying connection still remains open.

Furthermore, provision is made in some embodiments for a central section, of the pipe unit between the two ends of the pipe body to be arranged with play at least approximately in the direction of the depth direction.

Again, other embodiments envisage that the central section be arranged substantially without play.

It is particularly expedient if the pipe unit is arranged and in particular is held with play at least partly in at least one direction, in particular in a plurality of directions, which runs/run at least approximately perpendicularly to the depth direction.

In particular, the one end of the pipe unit which is provided for the connection to the fluid line is arranged and in particular held with play in at least one direction, preferably in a plurality of directions running at least approximately perpendicularly to the depth direction. This end can thereby be centred relative to the connector of the fluid line in a particularly expedient manner whereby on the one hand, the assembly process is simplified and on the other hand, the sealing at this position is improved due to the precise interlocking of the parts.

In the case of a particularly expedient embodiment, provision is made for the other end of the pipe unit which dips into the oil in particular when in use to be arranged and in particular held with play in at least one direction, for example in a plurality of directions running at least approximately perpendicularly to the depth direction.

The effect is thereby achieved for example that this end can shake somewhat within its play and so dirt particles hanging on the filter can be loosened whereby the filter will clog less rapidly.

In the case of other expedient embodiments, provision is made for this other end of the pipe unit to be held substantially without play in a direction running at least approximately perpendicularly to the depth direction so that it is arranged rigidly in an expedient manner.

Both in regard to the preceding and the following description, an arrangement with play, in particular, holding with play is to be understood as meaning that the pipe unit is arranged such as to be moveable in a range exceeding the manufacturing-related magnitude or is held in this range, and wherein this range is substantially pre-defined for example, up to exactly the manufacturing-related magnitude.

In particular, provision is made for enabling a deflection of the pipe unit within a pre-defined range which exceeds the manufacturing-related magnitude.

For example, the magnitude of the play, in particular the magnitude of the permitted deflection from the nominal position, is at the most ±10 mm, in particular at most ±5 mm, preferably at most ±1 mm, for example, at most ±0.5 mm.

In particular, provision is made for the magnitude of the play, in particular the magnitude of the permitted deflection from the nominal position to amount to at least 0.005 mm, in particular at least ±0.01 mm, preferably at least ±0.05 mm.

For example, provision is made in some embodiments for the permitted play to be given in only one direction from the nominal position.

Typically, provision is made in advantageous embodiments for the play to be given on both sides in one direction from the nominal position.

Up to now, no precise indications have been given in regard, to other constructional features or elements of the arrangement of the pipe unit on the sump body.

For this purpose for example, the sump device comprises a holding device wherein in particular, the pipe unit is arranged on the sump body with play by means of the holding device, in particular, the holding device holds the pipe unit with play.

It is thereby possible in a simple manner to provide an arrangement for the pipe unit with play, wherein on the other hand, the holding device preferably arranges the pipe unit on the sump body in loss-free and functional manner.

Moreover, the effect is achieved in expedient manner that the pipe unit is held despite the play and thus will not be excessively worn or even damaged due to lying loosely in a sump space of the sump body.

In particular, the pipe unit is arranged on the sump body such as to be detachable again. Hereby, it is particularly expedient that the pipe unit is arranged on the sump body during use and the sump device can function properly and, for maintenance purposes, the pipe unit can be detached again from the sump body without incurring damage thereto. In consequence for example, the pipe unit itself or a filter of the pipe unit is easily replaceable in a simple manner.

In particularly preferred embodiments, provision is made for the holding device to hold the pipe unit such as to be detachable again.

In particular, the holding device comprises at least one or exactly one holding element, preferably a plurality of holding elements. In particular thereby, provision is made for the exactly one or at least one holding element or some, in particular all of the plurality of holding elements to comprise one or more of the features described below.

In particular, provision is made for the holding device to comprise a plurality of boundary surfaces and for the pipe unit to be arranged with play between these boundary surfaces. Thus, delimitation of the play is given in a constructionally simple manner by a respective boundary surface and, due to the configuration of the boundary surfaces, the amount and the direction of the permitted play can be defined in a simple manner.

Preferably, the pipe unit is in each case arranged with play between two boundary surfaces so that, in the direction corresponding to that in which the pipe unit is arranged between the two boundary surfaces, the play is limited on both sides in a defined way.

In particular thereby, the two boundary surfaces are arranged such as to be spaced from each other by a spacing which is greater at least approximately by the amount of permitted play than the extent of the part of the pipe unit that is arranged between the two boundary surfaces and wherein this extent is measured in the direction which runs from the one to the other one of the two boundary surfaces.

In particular, the pipe unit comprises a contact surface corresponding to at least one boundary surface, in particular, to each one of the plurality of boundary surfaces.

Preferably, at least one boundary surface and/or at least one contact surface, in particular, each of the boundary surfaces and contact surfaces comprises one or more of the features described in the following.

In particular thereby, the boundary surface and its corresponding contact surface are configured in such a manner that they substantially do not touch each other as long as the pipe unit lies within the permitted degree of play and that the contact surface strikes the boundary surface as soon as the positioning of the pipe unit reaches a limit of the permitted amount of play.

Thus, a range for the permitted amount of play is given by the boundary surfaces in a simple manner.

Typically, a contact surface of the pipe unit adopts a nominal location when the pipe unit is positioned in the nominal position.

In advantageous manner, the boundary surfaces are arranged such as to be spaced by a respective spacing from the nominal location of a respectively corresponding contact surface. The pipe unit is thereby given a degree of play about the nominal position.

In particular, the respective spacing of the boundary surface from the nominal location of the corresponding contact surface corresponds to an appropriate maximally permitted deflection of the pipe unit from the nominal position, wherein in particular, the permitted deflection is taken with respect to the region of the contact surface and in the direction towards the boundary surface.

For example, the pipe body itself comprises one or more contact surfaces.

In the preferred embodiments, provision is made for the pipe unit to comprise at least one or exactly one locating element, in particular, a plurality of locating elements. Preferably, the one locating element or some, in particular, all of the plurality of locating elements comprise one or more of the features described below.

In particular, the locating element is provided for the purposes of locating the pipe unit on the sump body.

For this purpose, it is advantageous if the locating element arranged on an outer surface of the pipe body.

Hereby, the locating element could be mounted on the pipe body.

In the case of particularly advantageous embodiments, provision is made for the locating element and the pipe body to be formed in one-piece manner.

In particular, the locating element has exactly one or at least one contact surface and so corresponds in particular to a holding element having at least one corresponding boundary surface.

In the case of particularly preferred embodiments, provision is made for the locating element to have at least two contact surfaces which, in particular, run at least approximately parallel to one another. Thus, by virtue of a single locating element, the play in one direction can be limited to the permitted amount on both sides by means of corresponding boundary surfaces.

It is particularly expedient if the locating element comprises contact surfaces which run at an angle to one another, for example, at least approximately perpendicularly to each other so that the permitted amount of play can be limited in a plurality of directions in advantageous manner with only this one locating element.

In the case of some expedient embodiments, provision is made for the pipe body to be arranged at least partly between two boundary surfaces, for example, two boundary surfaces of two holding elements. Thus, a particularly stable arrangement of the pipe body can be established in this region.

For example, the holding element on a side which faces the pipe body is formed such as to be substantially flat and this flat surface forms a boundary surface for a corresponding contact surface of the pipe body.

In particularly advantageous embodiments, provision is made for the holding element to comprise an intermediate space which, in particular, is bounded by at least two boundary surfaces.

In particular the intermediate space is open in the direction of the withdrawal direction, thus in particular, comprises an opening oriented in this direction.

Thus, the holding element comprises an intermediate space which forms, in particular, a seating for a part of the pipe unit, and this is producible in a technically simple manner as it is open in the withdrawal direction and thus, during the process of injection moulding the sump body, that part of the mould which forms the intermediate space can easily be removed in the withdrawal direction.

A corresponding part of the pipe unit can be arranged with play in the intermediate space forming a seating in a constructionally simple manner and in particular the corresponding part is arranged in the seating with play.

It is preferred that the intermediate space should not have an undercut taken with reference to the direction of withdrawal, thus in particular, side surfaces of the intermediate space extend substantially flat in the withdrawal direction.

For example, opposite side walls of the intermediate space extend substantially in parallel with each other or the intermediate space widens towards the opening thereof in the withdrawal direction.

Hereby, it is particularly expedient, if an engagement body of the locating element engages in the intermediate space.

Thus on the one hand thereby, the permitted degree of play can be well defined by the configuration of the intermediate space and the engagement body whilst on the other hand, the intermediate space offers a stable holding arrangement for the engagement body and thus too for the pipe unit.

In particularly preferred embodiments, provision is made for the intermediate space to comprise at least two branches in which a respective leg of the corresponding engagement body preferably engages. The arrangement with play is thereby made possible whilst offering a stable holding arrangement at the same time. Moreover, due to the one locating element, it is possible in an expedient manner to enable the permitted degree of play to be provided in a well defined and stable manner in a plurality of directions.

In particular thereby, the respective branches are bounded in each case by at least one respective boundary surface, preferably by at least two boundary surfaces.

Preferably, the intermediate space is open in the direction of the depth direction, thus comprises an opening, in particular an insertion opening, oriented in particular in this direction.

In particular, the insertion opening of the intermediate space is for in a manner corresponding to that of the engagement body.

Thus, the engagement body can easily be, introduced into the intermediate space during the assembly process and economical assembly of the sump device is thereby made possible.

In some expedient embodiments, provision is made, especially in use of the sump device, for a cover element for closing the insertion opening, preferably for closing it in a manner such as to be removable again. Thus in use, the engagement body is held in the intermediate space by the cover element which in particular comprises a boundary surface, but can be removed again in a simple manner for maintenance and/or for replacement of the pipe unit, in particular, the filter.

In other particularly expedient embodiments, provision is made for the engagement body to be held in the intermediate space with play for example by means of a screw.

Preferably thereby, provision is made for the screw to be screwed into the holding element beside the intermediate space and for a part of the screw head to at least partly cover the insertion opening. In particular thereby, the corresponding part of the screw head comprises a boundary surface. The advantages of a simple installation process and the advantages for maintenance purposes and for the removal of the pipe unit are also provided by this solution.

In some particularly expedient embodiments, provision is made for at least one locating element to latch with a corresponding holding element. This enables secure and reliable assembly, whereby at the same time, the latched elements are held together with play in a stable manner whilst nevertheless preferably being separable from each other again.

For example thereby, one of the elements comprises a latching member which engages in a corresponding latching groove of the other element.

It is particularly expedient hereby if the latching groove also has boundary surfaces.

Up to now, no detailed indications have been given in regard to the production and the materials of the elements of the sump device other than that the sump body is formed substantially of plastics material and is made by an injection moulding process.

In some embodiments, provision is made for the pipe unit, in particular the pipe body, to be formed of metal.

Preferably, provision made for the pipe body to be formed of a plastics material. Particularly expedient hereby is a thermoplastic plastics material.

In some particularly advantageous embodiments, provision is made for the pipe body to be formed of a plurality of parts which are joined together by a friction welding process for example.

It is particularly preferred that the locating elements, the locating elements with the latching member for example, be moulded onto the pipe body.

Furthermore, the pipe unit comprises in particular a filter, preferably, t an end of the pipe body.

For example, the filter is formed at least partly from a plastics material, in particular, a thermoplastic plastics material.

In the case of particularly preferred embodiments, the filter comprises metal, in particular, stainless steel.

In regard to further advantageous configurations and materials in regard to the sump body and the pipe unit reference should be made to the documents DE 10 2004 024 517 A1 and WO 2013/117533 A1, the entire enclosure of which are hereby incorporated by reference in their entireties.

The preceding description of solutions in accordance with the invention thus encompasses in particular the various combinations of features defined by the following consecutively numbered embodiments:

1. Sump device (100) comprising a sump body (112), in particular for an oil supply in a commercial motor vehicle, with a pipe unit (140) comprising a pipe body (142), wherein the sump body (112) is an injection moulded part of plastics material, wherein the pipe unit (140) is arranged on the sump body (112) with play.
2. A sump device (100) in accordance with embodiment 1, wherein there is provided a nominal position for the pipe unit (140) and the pipe unit (140) is arranged, in particular, is held with play in this nominal position.
3. A sump device (100) in accordance with either of the preceding embodiments, wherein the pipe unit (140) is arranged, in particular, is held with play at least partially in the direction of a depth direction (122) of the sump body (112).
4. A sump device (100) in accordance with any of the preceding embodiments, wherein the pipe unit (140) is arranged, in particular, is held with play at least partially in at least one direction running at least approximately perpendicularly to the depth direction (122) of the sump body (112).
5. A sump device (100) in accordance with any of the preceding embodiments, wherein a holding device (160) which comprises in particular a plurality of holding elements (162) holds the pipe unit (140) with play in particular, in a manner such as to be releasable again.
6. A sump device (100) in accordance with any of the preceding embodiments, wherein the holding device (160) has a plurality of boundary surfaces (188) and in that the pipe unit (140) is arranged, in particular is held there between with play, in particular between two boundary surfaces (188) in each case.
7. A sump device (100) in accordance with any of preceding embodiments, wherein the boundary surfaces (188), with regard to a nominal location of a respective corresponding contact surface (222) of the pipe unit (140) which it adopts when the pipe unit (140) is positioned in the nominal position, are arranged at a corresponding spacing, wherein in particular, the respective spacing corresponds to a corresponding maximally permitted deflection of the pipe unit from the nominal position.
8. A sump device (100) in accordance with any of the preceding embodiments, wherein the pipe unit (140) comprises at least one locating element (166), in particular a plurality of locating elements (166), wherein in particular, the one locating element (166) or the plurality of locating elements (166) is/are arranged on an outer surface of the pipe body (142).
9. A sump device (100) in accordance with any of the preceding embodiments, wherein the pipe body (142) is arranged at least partially between two boundary surfaces (188).
10. A sump device (100) in accordance with any of the preceding embodiments, wherein an engagement body (174) of a locating element (166) engages in an intermediate space (172) of a holding element (162), wherein in particular, the intermediate space (172) is bounded by at least two boundary surfaces (188).
11. A sump device (100) in accordance with any of the preceding embodiments, wherein the intermediate space (172) the intermediate spaces (172) of at least one holding element (162), in particular of all the holding elements (162) is opened in the direction of a withdrawal direction and/or in the direction of the depth direction (122).
12. A sump device (100) in accordance with any of the preceding embodiments, wherein the intermediate space (172) of at least one holding element (162), in particular, the intermediate spaces (172) of all the holding elements (162) does/do not comprise an undercut taken with reference to the withdrawal direction.

13. A sump device (100) in accordance with any of the preceding embodiments, wherein the intermediate space (172) comprises at least two branches (184) which in particular are each bounded by at least two respective boundary surfaces (188).

14. A sump device (100) in accordance with any of the preceding embodiments, wherein at least one locating element (156) latches with a holding element (162).

Further preferred features and advantages of the invention form the subject matter of the drawings and the following explanations.

DETAILED DESCRIPTION OF THE INVENTION

Figure 1:
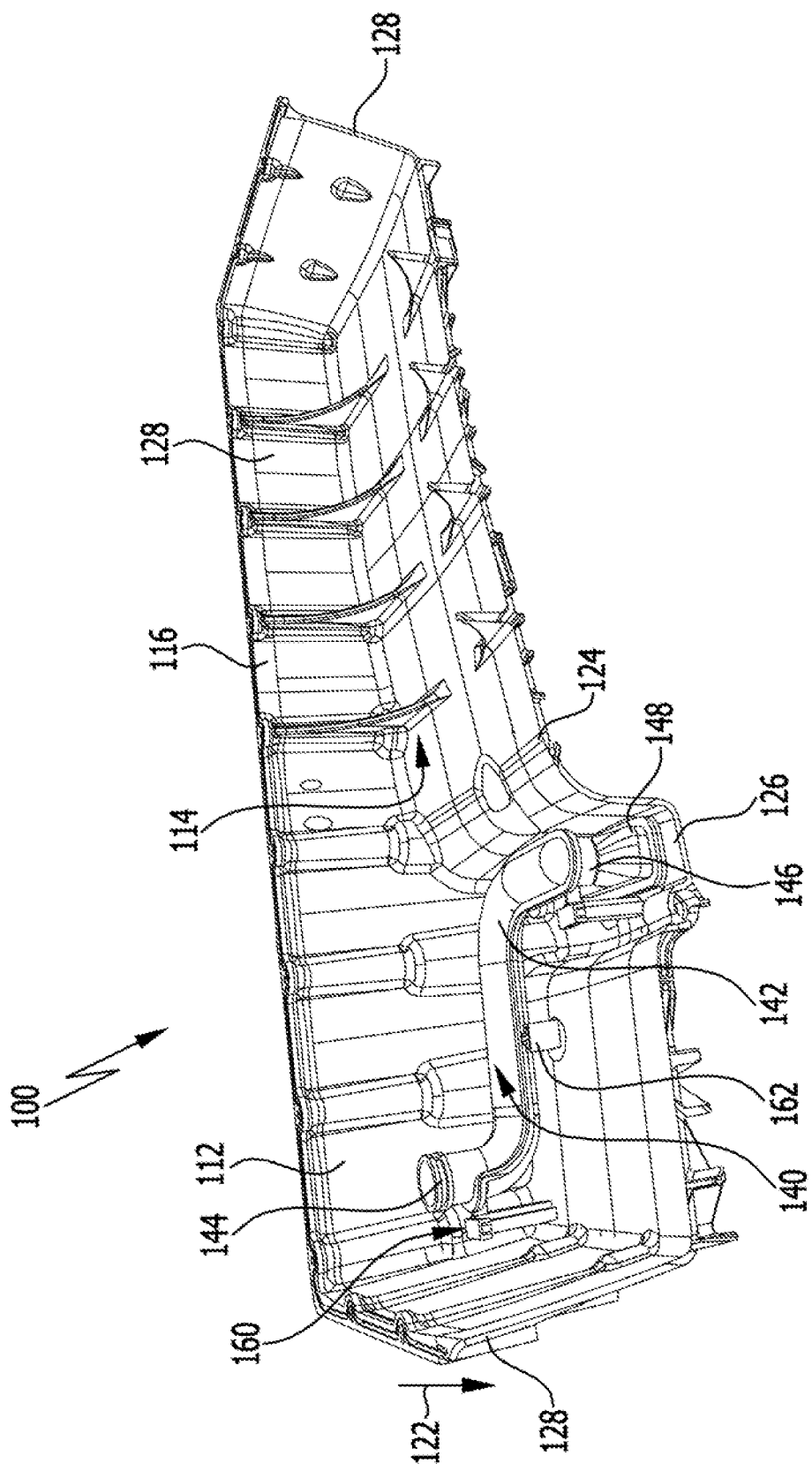
FIG. 1 shows a perspective illustration of a first exemplary embodiment of a sump device having a sump body and a pipe unit comprising a pipe body.
Figure 2:
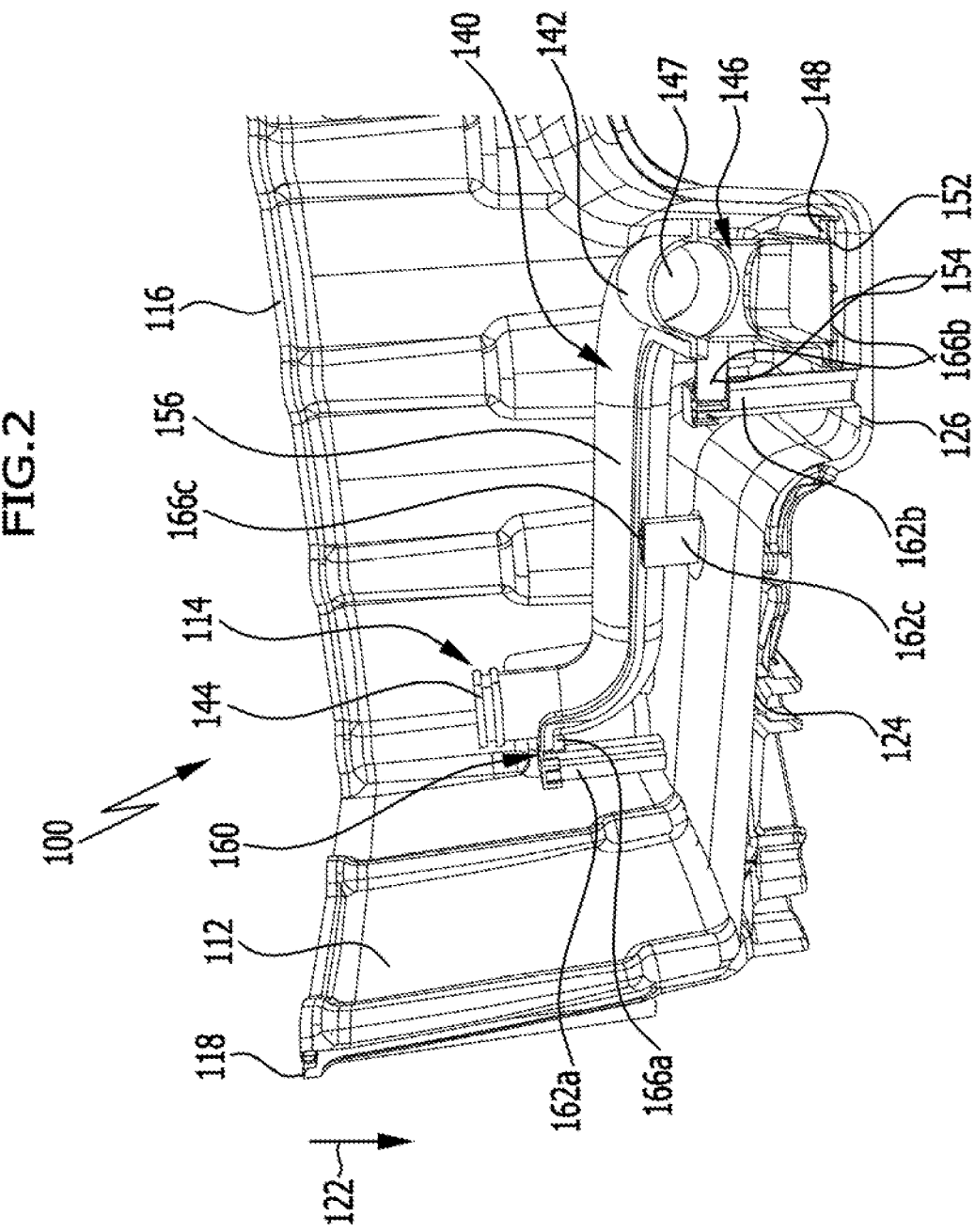
FIG. 2 a sectional view in the region of the pipe unit of the first exemplary embodiment.

A first exemplary embodiment of a sump device that is designated as a whole by 100 and is illustrated exemplarily in FIGS. 1 to 4 comprises a sump body 112 with a sump chamber 114. In particular, the sump device 100 is provided for the oil supply of a combustion engine and the sump body 112 is an engine oil sump.

Commencing from a sump opening 116 which is preferably surrounded by a flange 118 incorporating a sealing groove, the sump chamber 114 extends into the sump body 112 up to a sump base 124 substantially in a depth direction 122. For example, the flange 118 is a mounting flange with which the sump device 100 is adapted to be mounted on a device that is to be supplied with oil, in particular, a combustion engine.

In normal use of the sump device 100, the depth direction 122 runs in particular at least approximately parallel to the direction of the force of gravity so that the sump base 124 lies below the sump opening 116 taken with respect to the direction of the force of gravity.

In particular, taken with respect to the depth direction 122, the sump chamber 114 comprises regions of differing depth at which the spacing of the sump base 124 to the sump opening 116 is of differing magnitudes.

In particular, taken with respect to the depth direction 122, the sump chamber 114 comprises a lowest lying base section 126 at which the spacing of the base section 126 to the sump opening 116 is at its greatest. The lowest lying base section 126 is connected to further base sections, in particular, by means of base steps.

Transverse to the depth direction 122, the sumo chamber 114 is bounded by side walls 128 of the sump body 112 which extend in particular from the sump opening 116 to the sump base 124.

Furthermore, the sump device 100 comprises a pipe unit that is designated as a whole by 140 which comprises a pipe body 142. In particular, the pipe unit 140 is provided in order to extract oil from the sump body 112. For example thereby, the oil is sucked out and the pipe body 142 forms a suction pipe.

In particular, the pipe body 142 extends between a first end 144 and a second end 146.

The first end 144, which in particular is oriented towards the sump opening 116, comprises a pipe opening and is provided for connection to an oil line which runs to the device that is to be supplied with oil.

In particular, in an installed state, provision is made for a sealing system to seal a connection between the pipe body 142 and the oil line at the first end 144. For this purpose, the pipe body 142 comprises at the first end 144 a groove for an O-ring for example.

The second end 146 comprises a pipe opening which opens out into an interior space 147 of the pipe body 142. In the installed state, the interior space 147 of the pipe body 142 is connected to the oil line in fluid-conveying manner, in particular, through the first end 144.

At the second end 146, the pipe unit 140 comprises an end part 148 having an opening 152 which widens out, in particular, in the direction towards the sump chamber 114 and, at the other side, opens out into the interior space 147 of the pipe bod 142. A filter 154 is arranged on the end part 148 in the opening 152.

In this exemplary embodiment, the second end 146 is provided for sucking up oil so that, in particular, the end part 148 is a suction part 148. Due to the filter 154 in the opening 152 of the end part or suction part 148, coarse dirt is captured during the process of sucking in the oil and thus prevents this coarse dirt from entering the oil line.

The pipe n 140 is arranged on the sump body 112 with play.

In this exemplary embodiment, there is provided for this purpose a holding device 160 of the sump device 100. The holding device 160 comprises a plurality of holding elements 162a, 162b, 162c.

In the following, elements having an at least basically equivalent function are provided with the same reference symbol and referral shall only be made to a particular one of these substantially equivalent elements insofar as details by which the substantially equivalent elements differ are described, or for other reasons, and a letter in the form of a suffix is attached to the reference symbol by means of which this particular one element is specified.

For example, a respective holding element 162 is arranged with play on the pipe body 142 at each of the ends 144 and 146. In particular, provision is made for a holding element 162 to be arranged thereon with play at a central section 156 of the pipe body 142 which is located between the ends 144 and 146.

For the purposes of arranging the pipe body 142 on the holding device 160 in this exemplary embodiment, provision is made for the pipe unit 140 to comprise a plurality of locating elements 166 on the outer surface of the pipe body 142 which in particular are formed in one-piece manner with the pipe body 142.

In particular, a corresponding locating element 166a, 166b, 166c is provided for each one of the holding elements 162a, 162b, 162c.

Figure 3:
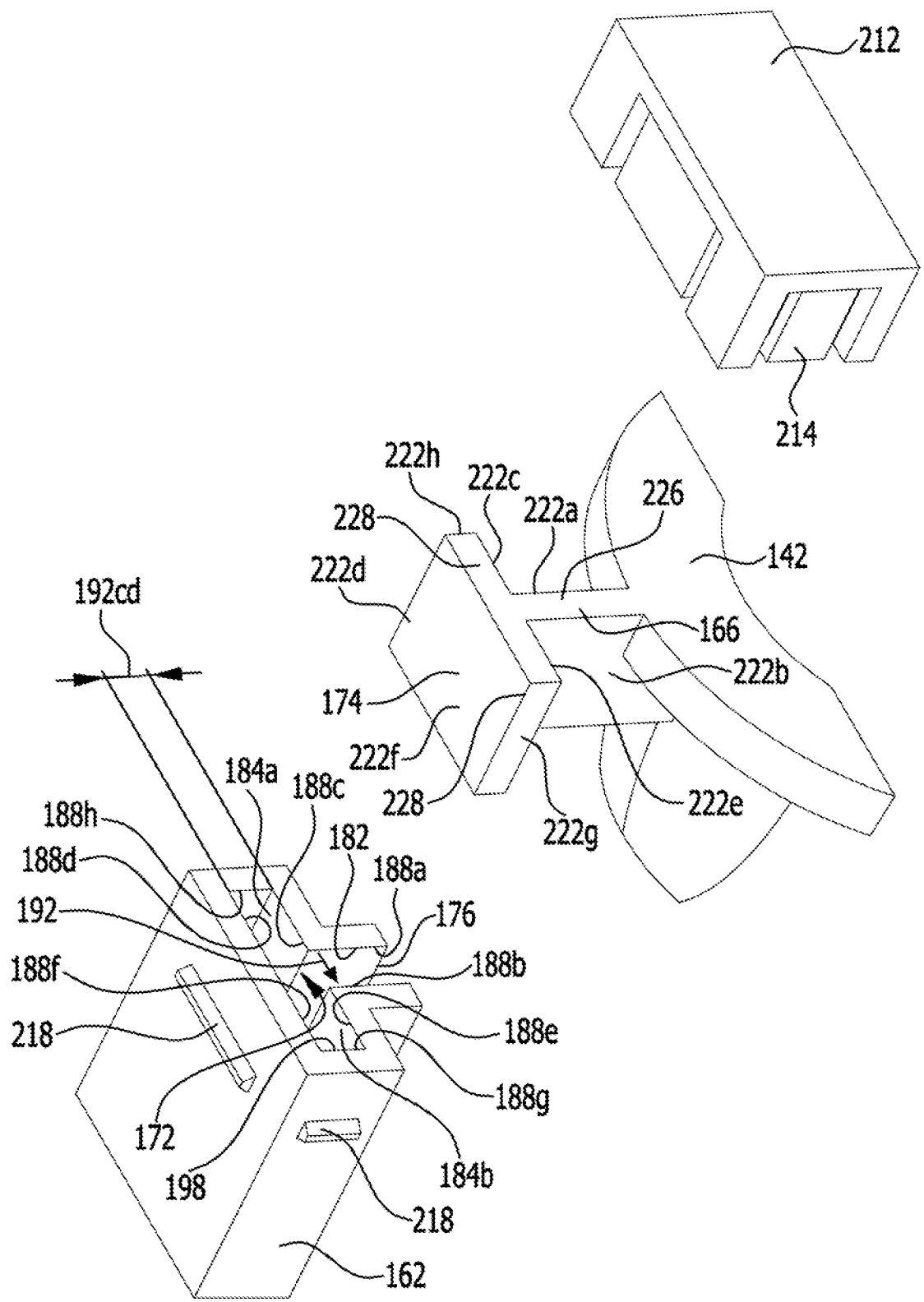
FIG. 3 an exploded view of a locating element having an engagement body and a holding element comprising an intermediate space.
Figure 5:
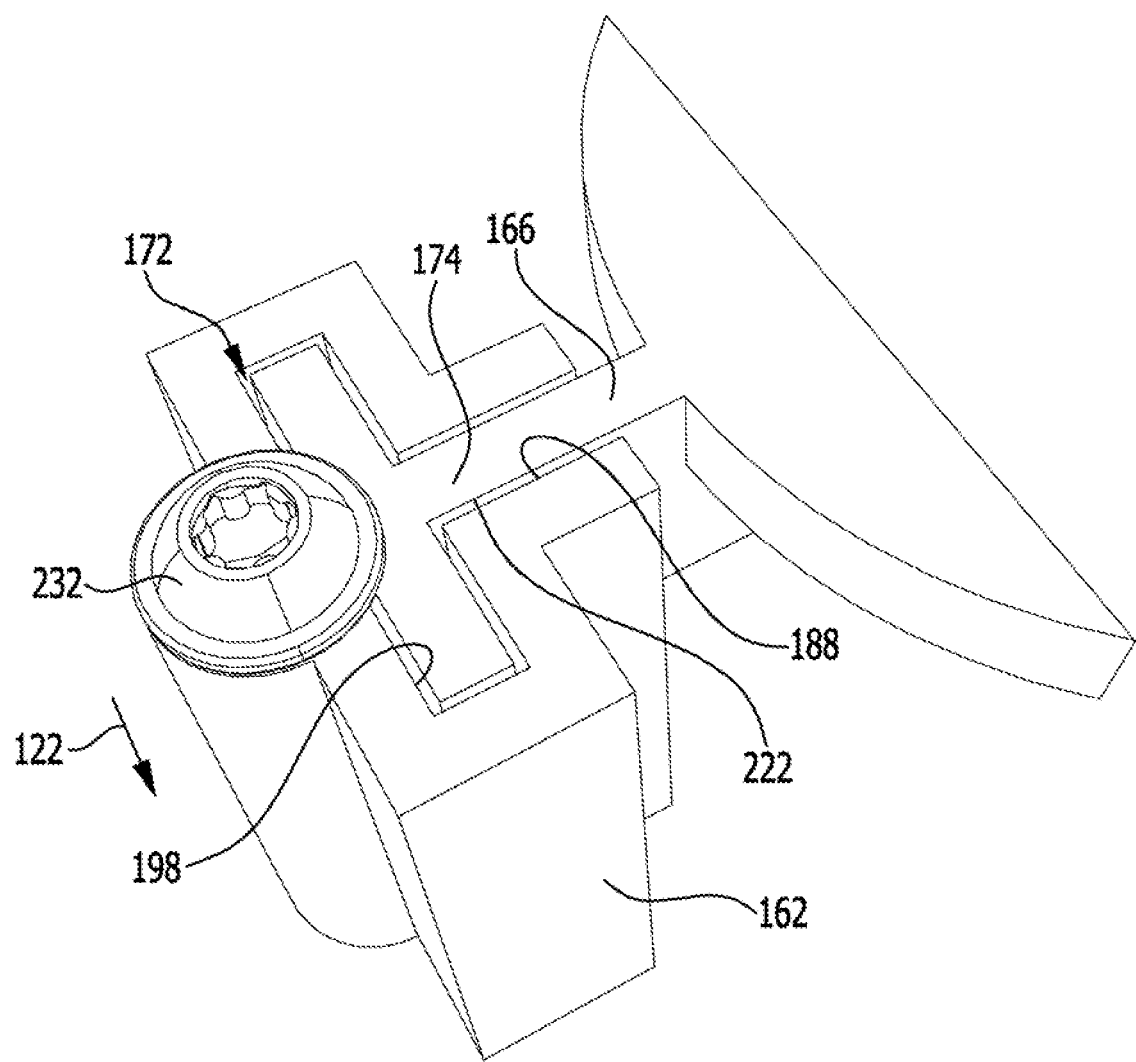
FIG. 5 a variant of the exemplary embodiment, wherein the locating element is held on the holding element by means of a screw.

The holding element 162 which is illustrated with a corresponding locating element 166 in exemplary manner in FIG. 3 and in a variant in FIG. 5 comprises an intermediate space 172 in which an engagement body 174 of the locating element 166 engages.

Hereby, in this exemplary embodiment, the intermediate space 172 is in the form of a slot, in particular a T-slot 172.

The intermediate space 172 comprises an access opening 176 through which the engagement body 174 engages in the intermediate space 172.

Commencing from the access opening 176, the intermediate space 172 runs into the holding element 162.

In the case of this exemplary embodiment, the intermediate space 172 is formed in branched manner, wherein the intermediate space 172 extends initially in the form of an access section 182 from the access opening 176 into the holding element 162 and then divides into two branches 184a and 184b. Herein, the branches 184a and 184b extend away from the access section 182, in particular, in substantially opposite directions.

Hereby, the intermediate space 172 is bounded by the boundary surfaces 188 formed by the holding element 162. Hereby, each of the two boundary surfaces 188, for example, the boundary surfaces 188a and 188b as well as 188c and 188d and also 188e and 188f as well as 188g and 188h run oppositely to each other and in particular, in correspondence with one another.

In particular, the boundary surfaces 188 run substantially planar, i.e. in each case substantially in a corresponding geometrical plane.

A respective part of the intermediate space 172 runs between each two oppositely located boundary surfaces 188, thus a respective one of the branches 184 runs between the boundary surfaces 188a and 188b of the access section 182 for instance and between the boundary surfaces 188c and 188d or 188e and 188f. In particular, the branches 184 end at a respective boundary surface 188g and 188h, wherein these boundary surfaces are also arranged opposite each other.

The boundary surfaces 188 bound the intermediate space 172 in a respectively corresponding boundary direction 192, wherein the respective boundary surface 188 typically runs at least approximately perpendicularly to the corresponding boundary direction 192.

In the case of the appositely located boundary surfaces 188, the respective corresponding boundary directions 192 run at least approximately in the same direction.

Furthermore, the holding element 162 comprises an insertion opening 198 which likewise opens out into the intermediate space 172. This is formed substantially corresponding to the engagement body 174 so that when assembling the sump device 100, the engagement body 174 can be inserted through the insertion opening 198 into the intermediate space 172.

For this purpose, the boundary surfaces 188 preferably run at least approximately parallel to the depth direction 122.

The insertion opening 198 thereby opens the intermediate space 172 in the direction towards the sump opening 116.

In particular, commencing from the insertion opening 198, the boundary surfaces 188 also run into the holding element 162.

Figure 4:
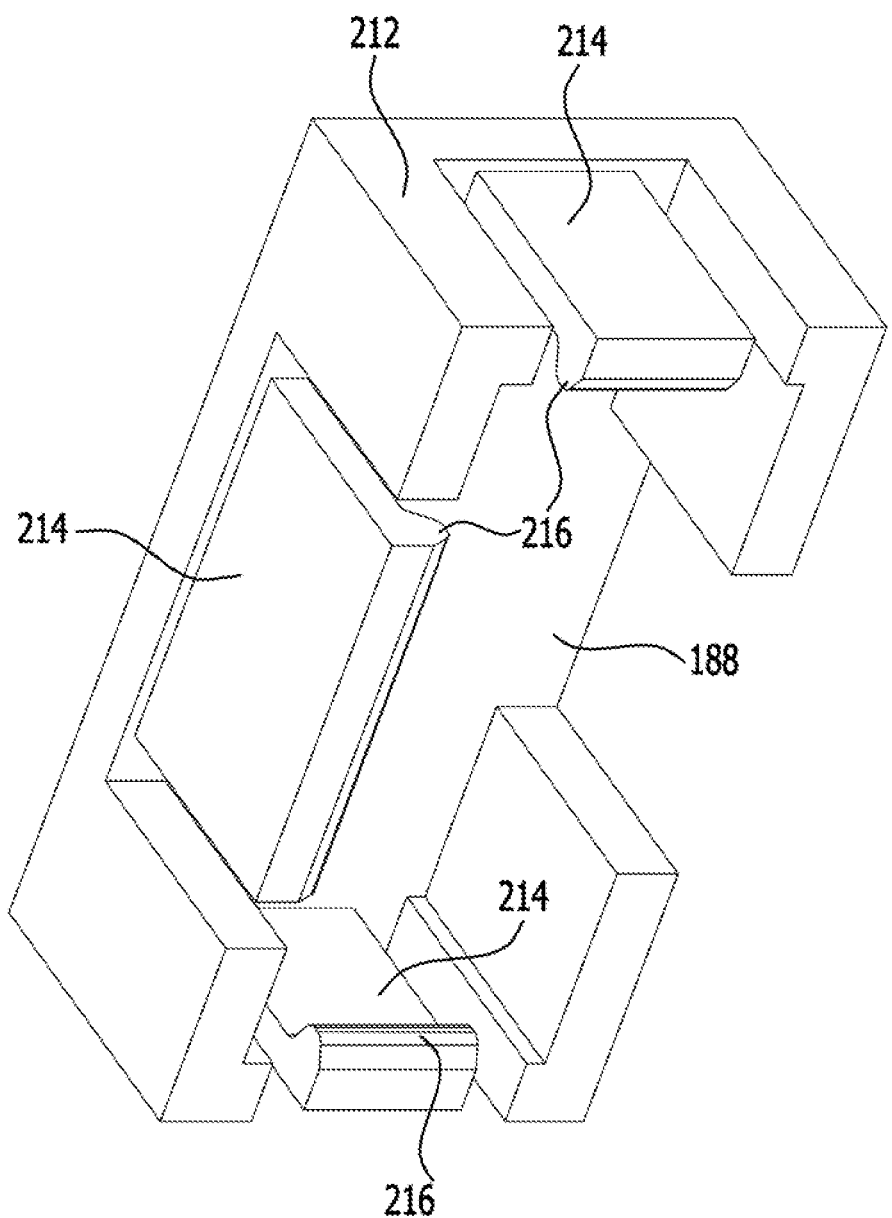
FIG. 4 a perspective illustration of a cover for the intermediate space.

Furthermore, there is provided a cover element 212 which can be placed over the insertion opening 198 and is illustrated exemplarily in FIG. 4.

In particular, the cover element 212 comprises, on an inner surface thereof, a boundary surface 188 which is arranged to abut against the insertion opening 198 in a placed on state of the cover element 212 and bounds the intermediate space 172 there. In particular, the boundary surface 188 of the cover element 212 is located opposite a further boundary surface 188 which is arranged on a base of the intermediate space 172 for instance.

For example, the cover element 212 is engagable with the holding element 162 and is connected thereto in releasable manner. For this purpose in the case of this exemplary embodiment, the cover element 212 comprises legs 214 which are arranged at one end on a part of the cover element 212 and the other end thereof is formed such as to enable it to swing slightly and is provided with a lug 216. The holding element 162 comprises a latching projection 218 behind which the lug 216 of the leg 214 engages when the cover element 212 is placed over the insertion opening 198.

The engagement body 174 is formed such as to substantially correspond to the shape of the intermediate space 172 so that the engagement body 174 fits into the intermediate space 172 with play.

Hereby, the engagement body 174 comprises contact surfaces 222, wherein each contact surface 222a, b, c, d, e, f, g, h corresponds to a respective boundary surface 188a, b, c, d, e, f, g, h.

Hereby, commencing from a contact surface 222, the engagement body 174 extends to a lesser extent in comparison with the corresponding extent of the intermediate space 172 commencing from the corresponding boundary surface 188 in the corresponding boundary direction 192.

Thus, in the case of oppositely located boundary surfaces 188, the extent of the engagement body 174 in the corresponding boundary direction 192 between the corresponding contact surfaces 222 is smaller than the spacing of the oppositely located boundary surfaces 188 in the boundary direction 192.

Hereby, the extent of the engagement body 174 is in each case at least approximately smaller by a length which corresponds to the amount of play that the pipe unit 140 is intended to have.

Thus, when a contact surface 222 of the engagement body 174 abuts on the corresponding boundary surface 188, provision is made in particular for a surface of the engagement body 174 which in particular is likewise a contact surface 222 and is located opposite the contact surfaces 222 in the corresponding boundary direction 192 not to abut on a boundary surface of the intermediate space 172 but rather, to be separated from a corresponding boundary surface 188 by a spacing which corresponds at least approximately to the amount of play which the engagement body 174 is intended to have. The previous statement applies insofar as the pipe unit 140 is intended to have some play in the corresponding boundary direction 192. Should the pipe unit 140 not have any play in the corresponding boundary direction 192, then the relevant contact surfaces 222 abut on their corresponding boundary surfaces 188.

An engagement section 226 of the engagement body 174 engages in the intermediate space 172 through the access opening 176. In this exemplary embodiment, the engagement body 174 is divided at one end of the engagement section 226 and the two legs 228 each run in a respective one of the branches 184.

Hereby, in a direction that is at least approximately perpendicular to the direction in which it extends through the access section 182, the engagement section 226 is of lesser extent than the access section 182 in this direction whereby the extent again corresponds at least approximately to the amount of the permitted play.

The legs 228 are of lesser extent in the direction in which they extend substantially through the respective branch 184 than the corresponding branch 184 in this direction, wherein the extent is again smaller in correspondence at least approximately with the permitted degree of play.

The functioning of the sump device 100 is thus briefly summarised as follows:

The pipe unit 140 is arranged in the sump body 112 with play, wherein the one opening of the pipe body 142 at the first end 144 is oriented toward the sump opening 116. A fluid line, for example an oil line, is connectable to this opening 144 whereby, due to the permitted degree of play of the pipe unit 140, the position of the end 144 of the pipe body 142 is slightly moveable and so is alignable in an expedient manner with the connector of the oil line and can be attached thereto.

At the other end 146, the interior 147 of the pipe body 142 opens out into the sump chamber 114 so that the fluid line is connected in fluid-conveying manner to the sump chamber 114. In particular, a fluid such as oil for example can be extracted from the sump chamber 114 through the second end 146. For this purpose, the second end 146 is arranged in particular in the region of the lowest lying base section 126 so that the end 146 dips into the fluid which is stored in the sump chamber 114 substantially independently of the level of the oil in the sump chamber 114 up to a minimum level, and so the fluid is extractable.

The holding device 160 holds the pipe unit 140 substantially in a nominal position in the sump chamber 114, in particular, by means of the holding elements 162, whereby the pipe unit 140 is moveable about the nominal position to the extent of the permitted amount of play. For this purpose, the boundary surfaces 188 of the holding device 160 are arranged such as to be spaced from a nominal location of the contact surfaces 222 which the latter adopt when the pipe unit 140 is positioned in the nominal position, wherein the spacing of the boundary surfaces 188 from the nominal location of the contact surfaces 222 corresponds at least approximately to the extent of the amount of play.

Hereby for example, provision is made for holding elements 162 to hold the pipe unit 140 with play in the region of the ends 144 and 146 and in the region of the central section of the pipe body 142.

In this exemplary embodiment of the pipe unit 140, it is thereby possible to have play both in the direction of the depth direction 122 and also perpendicularly thereto.

In the case of a variant of the exemplary embodiment that is illustrated exemplarily in FIG. 5, provision is made for the insertion opening 198 not to be covered by a cover element 212 but rather, for a region of the insertion opening 198 to be covered by a screw 232.

In particular, the screw 232 is screwed into the holding element 162 beside the intermediate space 172 and a region of a screw head of the screw 232 protrudes over the insertion opening 198.

A part of the screw 232 thereby covers the insertion opening 198 and again holds the locating element 166 and in particular the engagement body 174 in the intermediate space 172 in a releasable manner.

Hereby, a part of the screw 23 forms, namely that part which protrudes over the insertion opening 198, forms a boundary surface 188 the corresponding boundary direction 192 of which preferably runs at least approximately parallel to the depth direction 122, wherein the boundary surfaces 188 with their boundary direction 192 are not depicted in FIG. 5 as they are hidden in this illustration.

All the remaining parts in this variant are implemented in the same manner as in the first exemplary embodiment so that, in regard to the description thereof, reference should be made to the full contents of the preceding explanation.

Figure 6:
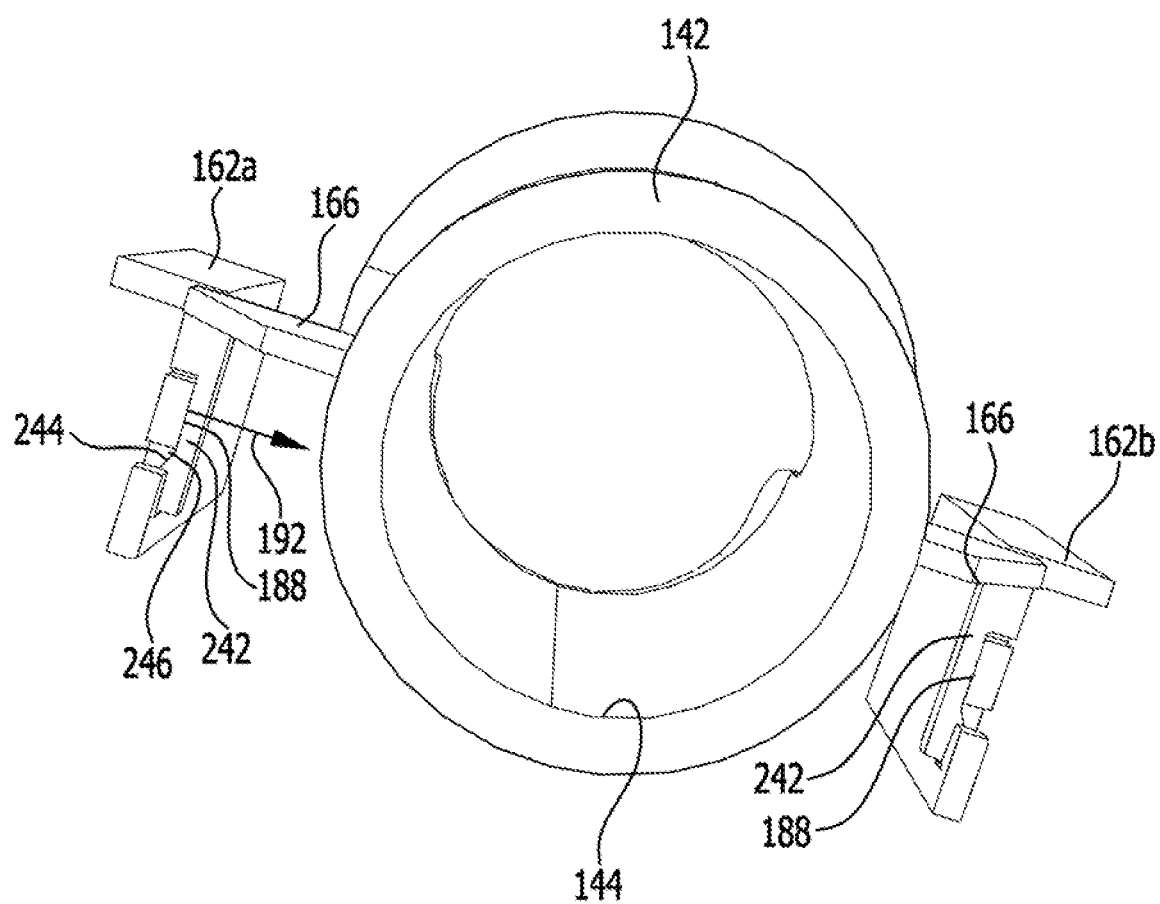
FIG. 6 a part of a pipe body with locating elements which engage in holding elements in accordance with a second exemplary embodiment.
Figure 7:
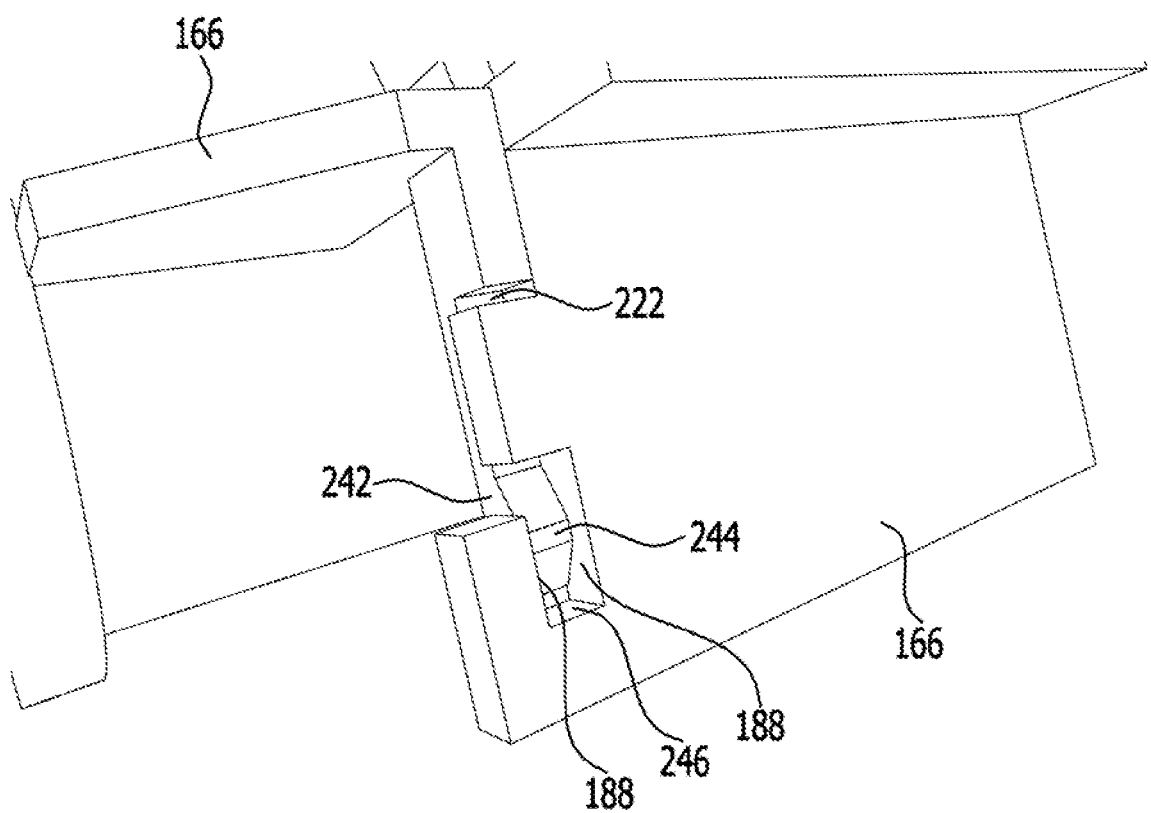
FIG. 7 an enlarged illustration of the locating element and the holding element which interengage with one another and FIG. 8 a perspective illustration of a suction part of the pipe unit which is held on a base of the sump body in guided manner by a holding element in accordance with a third exemplary embodiment.

In a second exemplary embodiment that is illustrated exemplarily in FIGS. 6 and 7, those elements which correspond to elements of the first exemplary embodiment are indicated by the same reference symbols and, in regard to the description thereof, reference should be made to the full contents of the preceding statements regarding the first exemplary embodiment.

In the case of the second exemplary embodiment, a part of the pipe body 142, the first end 144 thereof for example, is arranged between a pair of holding elements, the two holding elements 162a and 162b. Hereby, the holding elements 162 of the pair of holding elements comprise oppositely located boundary surfaces 188 and corresponding locating elements 166 of a corresponding pair of locating elements comprise corresponding contact surfaces 222.

For example hereby, the contact surfaces 222 abut on the corresponding boundary surfaces 188, whereby no play should be permitted the corresponding boundary direction 192.

In a variant of the exemplary embodiment, these contact surfaces 222 do not both abut on the corresponding boundary surfaces 188 at the same time, but rather, the boundary surfaces 188 are arranged such as to be spaced from the nominal location of the contact surfaces 222 by an amount such as to enable respective degrees of play since in the case of this variant a degree of play is to be permitted in the corresponding boundary direction 192.

Moreover in this exemplary embodiment, provision is made for the locating element 166 to latch with the holding element 162.

For this purpose, provision is made for the locating element 166 to comprise a latching member 242 with a latching lug 244, which engages in a latching groove 246 of the holding element 162 in the latched state.

For this purpose, the latching member 242 is formed such as to be readily moveable so that during the latching process, the latching lug 244 can retracted with respect to a part protruding towards the latching groove 246 and can pivot out of the retracted position into a latched position when definitively latching in the latching groove 246.

In particular, the latching lug 244 is somewhat smaller in one dimension than the latching groove 246, namely by an amount which corresponds to the permitted degree of play. Hereby in particular, the direction in which the latching lug 244 extends to a lesser amount than the latching groove 246 runs diagonally to the direction in which the latching lug 244 latches in the latching groove 246.

Furthermore, provision is preferably made for the latching groove 246 to have opposed boundary surfaces 188 which correspond to contact surfaces 222 on the latching lug 244 and wherein the corresponding boundary direction 192 runs at least approximately perpendicularly to the direction in which the latching lug 244 latches in the latching groove 246.

In all other respects, all the other parts of this exemplary embodiment are formed as was the case in the first exemplary embodiment and/or its variant, so that in regard to the description thereof, reference should be made to the full contents of the preceding expositions of the first exemplary embodiment.

In a third exemplary embodiment which is illustrated exemplarily in FIG. 8, each of those elements which correspond to one of the first or second exemplary embodiment are provided with the same reference symbol and with regard to the description thereof reference should be made to the full contents of the explanations of these exemplary embodiments.

In the case of the third exemplary embodiment, provision is made for a holding element 162 to be arranged on the sump base 124, in particular on the lowest-lying base section 126, and the pipe body 142, in particular the second end 146 thereof, is preferably held with play on the suction part 148.

For this purpose, a locating element 166 corresponding to the holding element 162 is provided on the pipe body unit 140 in particular on the suction part 148.

In particular, provision is made for the end 146 to be held with play in directions running at least approximately perpendicularly to the depth direction 122, whilst play is not made possible at least approximately in the depth direction 122.

For this purpose for example, the holding element 162 comprises a collar 252 which, taken with respect to the depth direction 122, projects over a bar 254 of the locating element 166 and the surfaces thereof touch each other so that play for the end 146 is not possible in the depth direction 122.

The bar 254 is displaceable relative to the collar 252 in a direction running at least approximately perpendicularly to the depth direction 122 until a contact surface 222 of an end piece of the bar 254 abuts a corresponding boundary surface 188 of a holding element 162, whereby in turn, this holding element 162 is arranged in such a manner that its boundary surfaces 188 are arranged at a spacing from a nominal location of the contact surface 222 which corresponds to the permitted amount of play.

In particular, the holding element 162 thus guides the bar 254 by means of the collar 252 in a direction running at least approximately perpendicularly to the depth direction 122. Consequently, this holding element 162 is formed in the manner of a guide-way.

In all other respects, all the other parts in this exemplary embodiment are formed in the same way as was the case in the first or second exemplary embodiment or the variants thereof so that with regard to the description thereof reference should be made to the preceding explanations.

The invention claimed is:

1. Sump device comprising a sump body, with a pipe unit comprising a pipe body wherein the sump body is an injection moulded part of plastics material, wherein the pipe unit is supported by the sump body with play at an outlet end of the of the pipe unit, and wherein an interior space of the pipe body extends between opposed ends of the pipe body, the interior space of the pipe body defined by the pipe body alone, thereby spaced away and separate from the sump body, and wherein the outlet end of the pipe unit is arranged with play at least partially in the direction of a depth direction of the sump body.

2. The sump device in accordance with claim 1, wherein the pipe unit is held with play.

3. The sump device in accordance with claim 1, wherein there is provided a nominal position for the pipe unit and the pipe unit is arranged with play in this nominal position.

4. The sump device in accordance with claim 1, wherein the pipe unit is arranged with play at least partially in at least one direction running at least approximately perpendicularly to the depth direction of the sump body.

5. The sump device in accordance with claim 1, wherein a holding device holds the pipe unit with play.

6. The sump device in accordance with claim 5, wherein the holding device has at least two boundary surfaces between which the pipe unit is arranged with play.

7. The sump device in accordance with claim 6, wherein the boundary surfaces, with regard to a nominal location of a respective corresponding contact surface of the pipe unit which it adopts when the pipe unit is positioned in the nominal position, are arranged at a corresponding spacing.

8. The sump device in accordance with claim 7, wherein the respective spacing corresponds to a corresponding maximally permitted deflection of the pipe unit from the nominal position.

9. The sump device in accordance with claim 1, wherein the pipe unit comprises at least one locating element which is arranged on an outer surface of the pipe body.

10. The sump device in accordance with claim 1, wherein the pipe body is arranged at least partially between two boundary surfaces.

11. The sump device in accordance with claim 1, wherein an engagement body of a locating element engages in an intermediate space of a holding element.

12. The sump device in accordance with claim 11, wherein the intermediate space is bounded by at least two boundary surfaces.

13. The sump device in accordance with claim 11, wherein the intermediate space of at least one holding element is opened in the direction of a withdrawal direction and/or in the direction of the depth direction.

14. The sump device in accordance with claim 11, wherein the intermediate space of at least one holding element does not comprise an undercut taken with respect to the withdrawal direction.

15. The sump device in accordance with claim 11, wherein the intermediate space comprises at least two branches.

16. The sump device in accordance with claim 15, wherein the at least two branches are each bounded by at least two respective boundary surfaces.

17. The sump device in accordance with claim 1, wherein at least one locating element latches with a holding element.

18. The sump device of claim 1, wherein the sump device is configured for an oil supply in a commercial motor vehicle.

19. Sump device comprising a sump body, with a pipe unit comprising a pipe body wherein the sump body is an injection moulded part of plastics material, wherein the pipe unit is arranged on the sump body with play, wherein a holding device holds the pipe unit with play, wherein the holding device comprises a plurality of holding elements for holding the pipe unit with play, the holding elements being supported by the sump body and spaced apart along a longitudinal direction of the pipe unit, and wherein the holding elements comprise a first holding element proximate a first end part of the pipe body, a second holding element proximate a second end part of the pipe body and a third holding element intermediate of the first and second holding elements.

20. The sump device of claim 19, wherein the outlet end of the pipe unit is arranged with play at least partially in the direction of a depth direction of the sump body.

21. The sump device of claim 19, wherein the first, second and third holding elements each separately hold the pipe unit with play.

22. Sump device comprising a sump body, with a pipe unit comprising a pipe body, wherein an interior space of the pipe body extends between opposed ends of the pipe body, the interior space of the pipe body defined by the pipe body alone, thereby spaced away and separate from the sump body, wherein the sump body is an injection moulded part of plastics material, wherein the pipe unit is arranged on the sump body with play, wherein a holding device holds the pipe unit with play, wherein the holding device is supported by the sump body and holds the pipe unit in a releasable manner, and wherein the outlet end of the pipe unit is arranged with play at least partially in the direction of a depth direction of the sump body.

23. Sump device comprising a sump body, with a pipe unit comprising a pipe body wherein the sump body is an injection moulded part of plastics material, the sump body including a sump base and a sump opening above the sump base, wherein the pipe unit is supported by the sump body with play proximate the sump opening, the pipe body extending between a first end oriented toward the sump opening and a second end, the second end enclosing an interior space that is spaced above and separate from the sump base for sucking up oil, and wherein the outlet end of the pipe unit is arranged with play at least partially in the direction of a depth direction of the sump body.

* * * * *